(12) United States Patent
Kato et al.

(10) Patent No.: US 7,197,005 B2
(45) Date of Patent: Mar. 27, 2007

(54) OPTICAL RECORDING METHOD AND MEDIUM

(75) Inventors: Tatsuya Kato, Tokyo (JP); Hideki Hirata, Tokyo (JP); Hajime Utsunomiya, Tokyo (JP); Hiroyasu Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 358 days.

(21) Appl. No.: 09/971,704

(22) Filed: Oct. 9, 2001

(65) Prior Publication Data

US 2002/0064122 A1 May 30, 2002

(30) Foreign Application Priority Data

Oct. 10, 2000 (JP) .............................. 2000-309956

(51) Int. Cl.
*G11B 7/24* (2006.01)
(52) U.S. Cl. .................................................. 369/275.4
(58) Field of Classification Search ............. 369/275.2, 369/275.3, 275.4, 277, 278, 279, 13.38, 13.45, 369/13.55
See application file for complete search history.

(56) References Cited

U.S. PATENT DOCUMENTS

| | | | | |
|---|---|---|---|---|
| 5,694,379 | A * | 12/1997 | Aratani et al. ............ | 369/13.55 |
| 5,916,730 | A | 6/1999 | Ide et al. | |
| 6,040,030 | A * | 3/2000 | Utsunomiya et al. .... | 369/275.4 |
| 6,125,101 | A | 9/2000 | Kikukawa et al. | |
| 6,167,006 | A * | 12/2000 | Tanaka et al. ............ | 369/44.26 |
| 6,175,548 | B1 * | 1/2001 | Kashiwagi ................ | 369/275.1 |
| 6,385,162 | B1 * | 5/2002 | Nagase et al. ............... | 369/288 |
| 6,449,239 | B1 * | 9/2002 | Uno et al. ................ | 369/275.1 |
| 6,611,492 | B2 * | 8/2003 | Akimori et al. ......... | 369/275.4 |
| 6,618,349 | B2 * | 9/2003 | Inoue et al. ............. | 369/275.4 |
| 6,636,477 | B1 * | 10/2003 | Miyamoto et al. .......... | 369/286 |

FOREIGN PATENT DOCUMENTS

| | | |
|---|---|---|
| EP | 0 777 216 | 6/1997 |
| EP | 0 831 468 | 3/1998 |
| EP | 0 880 131 | 11/1998 |
| EP | 0 919 996 | 6/1999 |
| EP | 0 977 189 | 2/2000 |
| EP | 0 984 443 | 3/2000 |
| EP | 0 994 470 | 4/2000 |
| EP | 1 039 451 | 9/2000 |
| JP | 2000-11453 | 1/2000 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

In an optical recording medium including a grooved light-transparent substrate, a phase change recording layer, a dielectric layer and a reflective layer, recording is carried out by irradiating a laser beam to the recording layer through an objective lens in an optical system. The recording is carried out in a groove recording mode under the conditions: $0.48 \leq P_T/(\lambda/NA) \leq 0.74$, and $P_T \leq 0.50$ µm wherein $\lambda$ is a laser beam wavelength, NA is an objective lens numerical aperture, and $P_T$ is a track pitch, thereby forming a recorded mark having opposite ends extending out of the groove. This enables high density recording and increases the data transfer rate of a phase change optical recording medium.

4 Claims, 3 Drawing Sheets

GROOVE RECORDING DISK

FIG. 5B

DISK FOR EVALUATION

OPTICAL RECORDING METHOD AND MEDIUM

This invention relates to an optical recording method and a phase change optical recording medium.

BACKGROUND OF THE INVENTION

Great attention is now paid to optical recording media capable of high density recording and erasing the once recorded information for rewriting. Among such rewritable optical recording media, phase change recording media are designed such that recording is performed by irradiating a laser beam to the recording layer to change its crystalline state and reading is performed by detecting the change of reflectivity of the recording layer associated with that state change. The phase change recording media are of greater interest because modulating the intensity of a single laser beam enables overwriting and the drive unit used for their operation may have a simple optical system as compared with that used for magneto-optical recording media.

For the phase change recording layer, chalcogenide materials such as Ge—Te and Ge—Sb—Te base materials are often used because of a greater difference in reflectivity between the crystalline and amorphous states and a relatively high stability in the amorphous state.

In phase change media with overwriting capability, amorphous recorded marks are formed by irradiating a laser beam at the recording power level to the crystalline recording layer for melting the irradiated spot, and rapidly cooling from the molten state. Erasion is carried out by irradiating a laser beam at the erasing power level to the recording layer to heat it to a temperature equal to or above its crystallization temperature, but below its melting point and then slowly cooling for allowing the amorphous recorded marks to crystallize. Then overwriting becomes possible by irradiating a single laser beam while modulating its intensity. The rate-determining factor in high speed recording of such phase change media is the crystallization speed of the recording layer, that is, the crystal transformation speed at which the material transforms from amorphous to crystalline. For high speed recording, a recording layer having a high crystallization speed may be used. At too high a crystallization speed, amorphous recorded marks become unstable due to the enhanced tendency to crystallize. Then, recording is often accompanied by cross-erasing that recorded marks in adjacent tracks are erased as well.

As a consequence, for the overwritable phase change media, it is prohibited to markedly increase the crystallization speed of the recording layer. This makes it difficult to significantly increase the data transfer rate. The cross-erasing can be reduced by increasing the arrangement pitch of recording tracks (referred to as track pitch), regrettably at the sacrifice of recording density.

SUMMARY OF THE INVENTION

An object of the invention is to enable high density recording and increase the data transfer rate of a phase change optical recording medium.

To attain this and other objects, the present invention provides an optical recording method for recording information in an optical recording medium comprising a grooved light-transparent substrate and a phase change recording layer thereon, by irradiating a laser beam thereto through an objective lens in an optical system. In one embodiment, the recording is carried out in the grooves under the conditions: $0.48 \leq P_T/(\lambda/NA) \leq 0.74$ and $P_T \leq 0.50$ µm, provided that the laser beam used for recording has a wavelength $\lambda$, the objective lens has a numerical aperture NA, and recording tracks are arranged at a pitch $P_T$.

Preferably, the medium is operated at a linear velocity of at least 4.5 m/s.

In another embodiment, the recording is carried out in the groove under the condition: $0.48 \leq P_T/(\lambda/NA) \leq 0.68$, provided that the laser beam used for recording has a wavelength $\lambda$, the objective lens has a numerical aperture NA, and recording tracks are arranged at a pitch $P_T$.

In either embodiment, the recording preferably forms a recorded mark having at least one end extending out of the groove.

Typically, the optical recording medium includes the recording layer, a dielectric layer, and a reflective layer stacked on the light-transparent substrate in the described order, the reflective layer has a thermal conductivity of at least 100 W/mK, and the dielectric layer has a thermal conductivity of at least 1 W/mK.

Also contemplated herein is an optical recording medium in which recording is carried out by the method defined above.

DESCRIPTION OF THE PREFERRED EMBODIMENTS

Phase change optical recording media featuring a high recording density include DVD-RW and DVD-RAM. In DVD-RW, recording is carried out in the groove recording mode where only the (guide) grooves utilized for tracking servo control serve as the recording track. In DVD-RAM, on the other hand, recording is carried out in the land/groove recording mode where both the grooves and the regions or lands between adjacent grooves serve as the recording track. The land/groove recording mode is believed advantageous due to narrow track pitches. The track pitch is 0.74 µm for DVD-RW and 0.615 µm for DVD-RAM.

Figure 1:
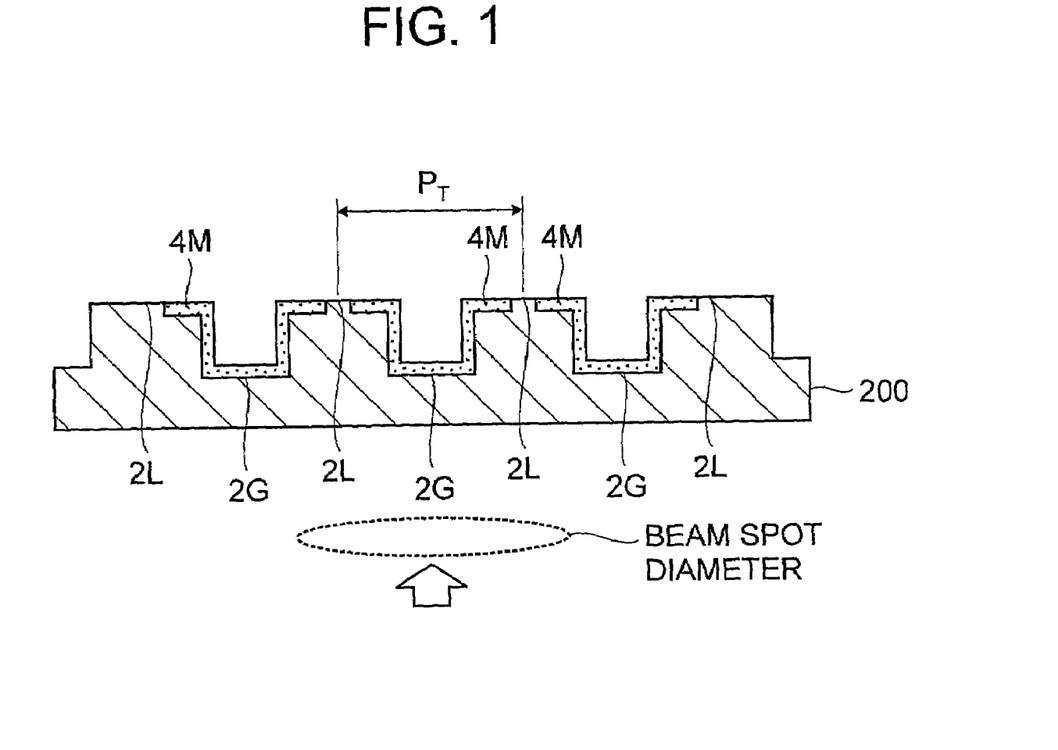
FIG. 1 is a schematic cross-sectional view of an optical recording medium of the groove recording mode.
Figure 2:
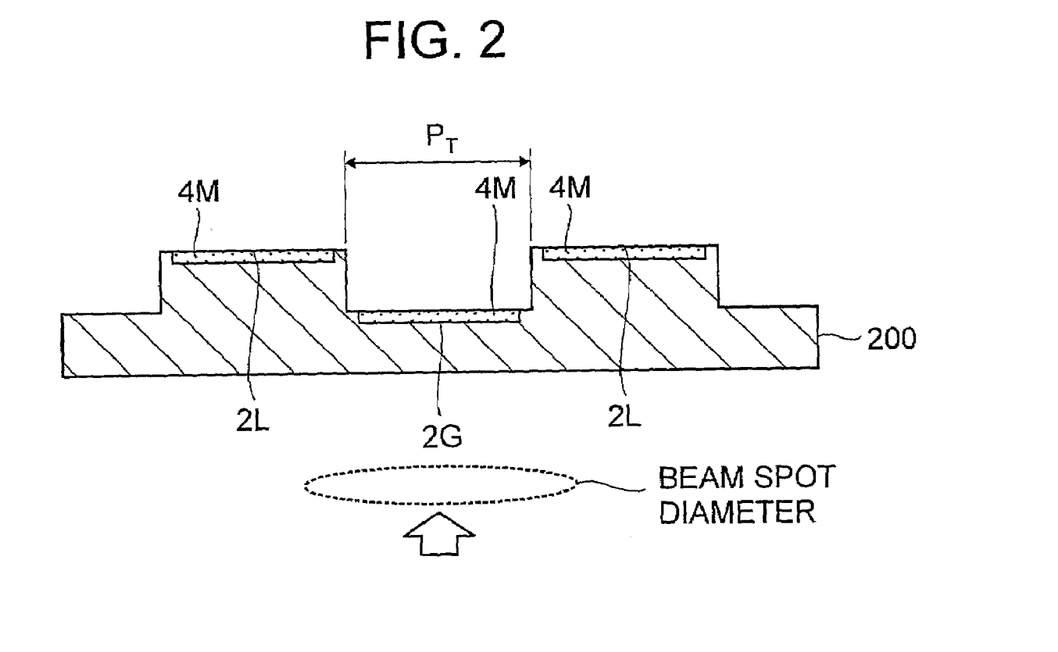
FIG. 2 is a schematic cross-sectional view of an optical recording medium of the land/groove recording mode.

FIG. 1 schematically shows in cross section an optical recording medium of the groove recording mode, and FIG. 2 schematically shows in cross section an optical recording medium of the land/groove recording mode. In each embodiment, a medium 200 in the form of a laminate of a light-transparent substrate and a recording layer is provided on its upper surface with grooves 2G and lands 2L. A recording/reading laser beam enters the medium 200 from its lower surface. The grooves 2G are regions which are located relatively closer to the laser beam incident surface whereas the lands 2L are regions which are located relatively remoter from the laser beam incident surface.

Recorded marks 4M formed in the groove recording mode, each have a center aligned with the groove 2G and transversely opposite ends extending out of the groove 2G and over the lands 2L. On the other hand, recorded marks 4M formed in the land/groove recording mode, each are located within the groove 2G or land 2L. For high density recording, it is desirable for a recording laser beam to define a beam spot of a large diameter relative to the track pitch. In this case, however, heat generated along the periphery of the beam spot can affect irrelevant tracks located adjacent to the relevant track subject to recording. Then amorphous recorded marks in such adjacent tracks can be heated at their ends so that they may be crystallized. This is cross-erasing.

In an optical recording medium where recording is carried out by irradiating a laser beam thereto through an objective lens in an optical system, the laser beam used for recording has a wavelength $\lambda$, and the objective lens has a numerical aperture NA. The laser beam defines on the recording layer surface a beam spot having an effective diameter which can be regarded as given by $\lambda/NA$. It is then regarded that the ratio of the track pitch to the beam spot diameter is represented by $P_T/(\lambda/NA)$, provided that the track pitch is $P_T$. The value of $P_T/(\lambda/NA)$ becomes a measure of potential cross-erasing in that smaller values of $P_T/(\lambda/NA)$ lead to more cross-erasing.

The inventors determined the quantity of cross-erasing on both a medium of the groove recording mode and a medium of the land/groove recording mode under the conditions that the track pitch was equal and the same optical system was used for recording, that is, $P_T/(\lambda/NA)$ was identical. As a result, neither the groove recording mode medium nor the land/groove recording mode medium suffered cross-erasing under the conditions including linear velocity=3.5 m/s,
$\lambda$=635 nm,
NA=0.60,
$P_T$=0.74 µm, and
$P_T/(\lambda/NA)$=0.699, which are approximately equal to the recording conditions for DVD-RW. However, when the track pitch was reduced and the remaining parameters were changed so as to provide an approximately equal value of $P_T/(\lambda/NA)$, that is, linear velocity=5.7 m/s,
$\lambda$=405 nm,
NA=0.85,
$P_T$=0.33 µm, and
$P_T/(\lambda/NA)$=0.693, the land/groove recording mode medium suffered a sharp rise of cross-erasing in grooves. By contrast, cross-erasing in lands was not observed at all, independent of whether the medium is of the groove recording mode or the land/groove recording mode.

Repeating similar runs, the inventors have found that under the conditions:

$0.48 \leq P_T/(\lambda/NA) \leq 0.74$, and
$P_T \leq 0.50$ µm, and especially, $0.50 \leq P_T/(\lambda/NA) \leq 0.70$, and
$P_T \leq 0.45$ µm, the cross-erasing can be significantly reduced by employing the groove recording mode rather than the land/groove recording mode. For this reason, the present invention provides for the groove recording mode when $P_T/(\lambda/NA)$ and $P_T$ are within the above-defined range.

The lower limit is given to $P_T/(\lambda/NA)$ because too small $P_T/(\lambda/NA)$ fails to fully reduce the cross-erasing, even in the groove recording mode. The lower limit of $P_T$ is determined by the lower limit of $P_T/(\lambda/NA)$.

For high density recording as contemplated herein, the effective beam spot diameter is preferably set to be $\lambda/NA \leq 680$ nm, and more preferably $\lambda/NA \leq 630$ nm. However, since the laser wavelength and the numerical aperture that can be utilized in practice have certain limits, it is difficult to have a very short wavelength and a very large numerical aperture. Then $350 \text{ nm} \leq \lambda/NA$ is generally recommended.

Although the invention is not bound to the theory, it is believed that cross-erasing is reduced by the invention for the following reason.

Figure 3:
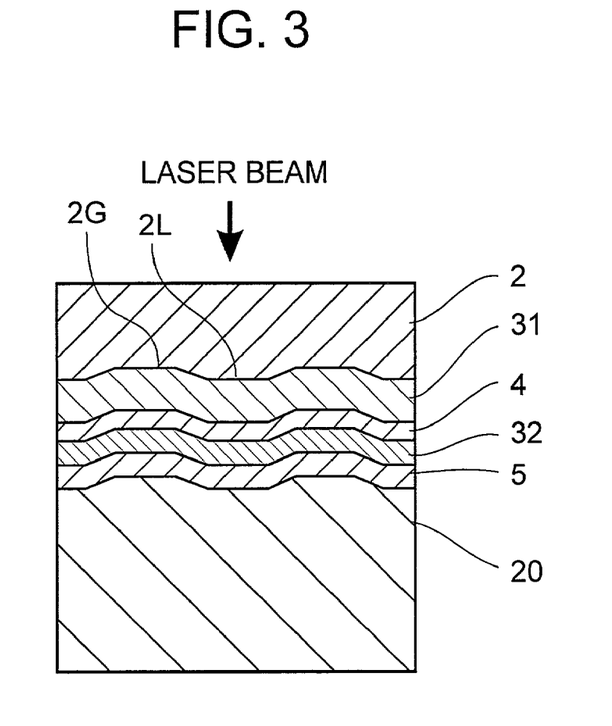
FIG. 3 is a cross-sectional view of one exemplary optical recording medium.
Figure 4:
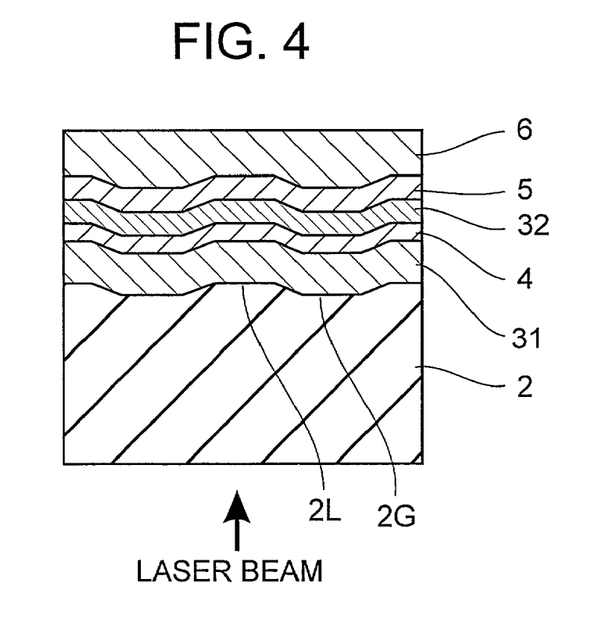
FIG. 4 is a cross-sectional view of another exemplary optical recording medium.

The phase change medium generally has such a structure as shown in FIGS. 3 and 4 wherein a light-transparent substrate 2, a first dielectric layer 31, a recording layer 4, a second dielectric layer 32 and a reflective layer 5 are stacked in the described order. The reflective layer 5 made of metal also serves as a heat-dissipating layer so that the recording layer 4 once heated by irradiation of a laser beam is cooled through heat release to the reflective layer 5 through the second dielectric layer 32. Unlike the groove 2G, the land 2L is surrounded by the second dielectric layer 32 and the reflective layer 5. The portions of the land 2L proximate to its ends are located closer to the reflective layer 5 than the groove 2G. Then, the land 2L, especially its end portions, is more readily cooled than the groove 2G.

Accordingly, in the land/groove recording mode illustrated in FIG. 2, even when the opposite ends of the recorded mark 4M existing in the land 2L are heated by the periphery of the laser beam spot irradiated to the adjacent track that overlaps the mark ends, they are subsequently rapidly cooled. Then the opposite ends of the recorded mark 4M are less susceptible to crystallization, resulting in less cross-erasing. By contrast, the opposite ends of the recorded mark 4M existing in the groove 2G, once heated by the periphery of the laser beam spot irradiated to the adjacent track, are ineffectively cooled. As a consequence, the opposite ends of the recorded mark 4M in the groove 2G are kept at a temperature near the crystallization temperature for a relatively long time and eventually crystallized. More cross-erasing occurs in the groove 2G.

On the other hand, in the groove recording mode illustrated in FIG. 1 where the track pitch is set equal to the track pitch used in the land/groove recording mode, if a recorded mark 4M is formed so as to be confined within the groove, then the recorded mark 4M has an insufficient area to provide a satisfactory carrier-to-noise ratio (CNR). This means that, in the groove recording mode using a narrow track pitch, the recorded mark 4M must extend out of the groove 2G. The recording mark 4M extending out of the groove 2G indicates that the recorded mark 4M has opposite ends located on the ends of the lands 2L as depicted in FIG. 1. The periphery of the laser beam spot irradiated to the adjacent track covers the end of land 2L, that is, the end of the recorded mark 4M. Nevertheless, the end of the recorded mark 4M is not crystallized because the end of the land 2L is readily cooled so that its temperature quickly lowers, as mentioned above. It is then believed that in the groove recording mode, cross-erasing is reduced in all the recording tracks.

To exert the cross-erasing reducing effect according to the invention, the recorded mark formed in the groove recording mode should preferably have at least one end, more preferably both ends, extending out of the groove. More specifically, provided that the recorded mark has a width Mw and the groove has a width Gw, they should preferably satisfy Mw/Gw>1, more preferably Mw/Gw≧1.1, and even more preferably Mw/Gw≧1.4. The recorded mark width Mw relative to the track pitch $P_T$ is also important. Since too high a ratio of the recorded mark width Mw to the track pitch $P_T$ may allow more cross-erasing to occur, it is preferred to set Mw/$P_T$≦0.95 and more preferably Mw/$P_T$≦0.90. To achieve both a higher recording density and a satisfactory CNR, it is preferred to set Mw/$P_T$≧0.60 and more preferably Mw/$P_T$≧0.65.

The groove width Gw relative to the track pitch $P_T$ is not so important. The groove width Gw is determined so as to give Mw/Gw in the preferred range, although it is preferred to set 0.1≦Gw/$P_T$≦0.8 and more preferably 0.2≦Gw/$P_T$≦0.6. Too low a Gw/$P_T$ leads to smaller tracking error signals, which may lead to unstable tracking servo control. Inversely, too high a Gw/$P_T$ leads to lower Mw/Gw, partially losing the effect of the invention.

Although the depth of the grooves is not critical in the practice of the invention, it is preferred that the groove depth $G_D$ be in the range:

$\lambda/13n \leq G_D \leq \lambda/6n$ wherein the light-transparent substrate has a refractive index n. Too shallow grooves may lead to more cross-erasing whereas too deep grooves may produce less signal outputs on reading.

To enhance the cross-erasing reducing effect according to the invention, the cooling efficiency of the land 2L is preferably increased. To this end, the structure shown in each of FIGS. 3 and 4 should preferably be a rapid cooling structure in which the reflective layer 5 has a thermal conductivity of at least 100 W/mK, and the second dielectric layer 32 between the recording layer 4 and the reflective layer 5 has a thermal conductivity of at least 1 W/mK.

It is now considered why a track pitch $P_T$ smaller than the specific value results in increased cross-erasing despite equivalent $P_T/(\lambda/NA)$. In FIGS. 1 and 2, the recorded marks 4M are in accurate alignment with the grooves 2G or lands 2L. That is, these figures are drawn on the assumption of accurate tracking. However, in an actual process, the tracking servo control will sometimes become unstable, especially at a high linear velocity. If the tracking servo control is unstable, the position of a beam spot fluctuates in a lateral direction in the figures, increasing the likelihood of cross-erasing. The instability of the tracking servo control depends on just the track pitch $P_T$ rather than the relative value of the track pitch to the beam spot diameter, $P_T/(\lambda/NA)$. The tracking servo control becomes more unstable at a smaller track pitch $P_T$. As a consequence, even with the setting of $P_T/(\lambda/NA)$ equal to DVD-RW, noticeable cross-erasing occurs when $P_T$ is smaller than that of DVD-RW. It is noted that the present invention is effective particularly when the linear velocity is so high that the tracking servo control may become unstable, and specifically when the linear velocity V of the medium is V≧4.5 m/s, and especially V≧5.5 m/s. Since too high a linear velocity gives rise to the problems of the increased cost of a medium driving unit and unstable driving of the medium, the linear velocity V is preferably 35 m/s≧V, and especially 30 m/s≧V.

When the track pitch $P_T$ is large and/or when the linear velocity is low, the likelihood of cross-erasing caused by a tracking servo failure is minimized. Although the instability of tracking servo control has a minimal influence, the cross-erasing becomes substantial if $P_T/(\lambda/NA)$ is below 0.68. Then the invention is effective independent of the track pitch $P_T$ when $P_T/(\lambda/NA)$ is in the range: 0.48≦$P_T$/($\lambda$/NA)≦0.68.

Known phase change media employing the groove recording mode include CD-RW and DVD-RW, for example. However, a medium based on the groove recording mode and having a track pitch $P_T$ as specified by the invention is not known in the art. It is also unexpected that the land/groove recording mode, which is generally believed advantageous to narrow track pitches, suffers substantial cross-erasing in grooves and that the groove recording mode, which is generally believed disadvantageous to narrow track pitches, is advantageous for cross-erasing.

Described below are illustrative constructions of the optical recording medium to which the invention is applied.

Structure of FIG. 3

The optical recording medium includes on a supporting substrate 20, a reflective layer 5 of metal or metalloid, a second dielectric layer 32, a recording layer 4, a first dielectric layer 31, and a light-transparent substrate 2 stacked in the described order. A recording/reading laser beam is irradiated to the recording layer 4 through the light-transparent substrate 2 (from the upper side in FIG. 3). An intermediate layer of dielectric material (not shown) may be disposed between the supporting substrate 20 and the reflective layer 5.

Supporting Substrate 20

The supporting substrate 20 is provided to maintain rigidity for the medium. The supporting substrate 20 usually has a thickness of about 0.2 to 1.2 mm, preferably 0.4 to 1.2 mm, and may be transparent or opaque. The supporting substrate 20 may be formed of any resin like conventional optical recording media although glass may also be used. Grooves 2G and lands 2L can be formed by forming a recess and protrusion pattern in the supporting substrate 20 and transferring the pattern to the respective overlying layers, as in the illustrated embodiment.

Reflective Layer 5

The reflective layer may be formed of any material which is usually selected from metals and metalloids such as Al, Au, Ag, Pt, Cu, Ni, Cr, Ti and Si and alloys containing at least one such metal or metalloid. Since the invention favors the medium to have a rapid cooling structure, it is preferred to form the reflective layer from a material having a high thermal conductivity. Preferred high thermal conductivity materials are Ag and Al. Since Ag or Al alone, however, is less resistant to corrosion, it is recommended to add another element to Ag or Al for improving corrosion resistance. In the medium of the structure shown in FIG. 3, the reflective layer tends to have an increased surface roughness on the laser beam incident side due to crystal growth during its formation. The increased surface roughness can lead to an increased read noise. It is thus preferred to reduce the grain size of the reflective layer. In this regard too, it is recommended to add another element to Ag or Al rather than the use of Ag or Al alone, so that the reflective layer may be formed to a smaller grain size or as an amorphous layer.

Since the addition of another element often entails a decline of thermal conductivity, it is preferred to use Ag having a higher thermal conductivity as a main element for avoiding such inconvenience. The preferred auxiliary element to be added to Ag is at least one selected from among Mg, Pd, Ce, Cu, Ge, La, S, Sb, Si, Te, and Zr. One or more of these auxiliary elements may be used. The content of auxiliary elements in the reflective layer is preferably 0.05 to 2.0 atom %, more preferably 0.2 to 1.0 atom % for each element, and preferably 0.2 to 5 atom %, more preferably 0.5 to 3 atom % in total. Too small contents of auxiliary elements fail to exert the desired effects. Too large contents of auxiliary elements would result in a decline of thermal conductivity.

It is noted that the thermal conductivity of the reflective layer decreases as the grain size becomes smaller. If the reflective layer is amorphous, it is difficult to acquire a sufficient cooling rate upon recording. Therefore, once the reflective layer is formed as an amorphous layer, heat treatment is preferably carried out for crystallization. The procedure of inducing crystallization of the initially amorphous layer has the advantage that the layer maintains the surface roughness that the amorphous layer has had and the thermal conductivity is increased by crystallization.

The reflective layer should preferably have a thermal conductivity of at least 100 W/mK, more preferably at least 150 W/mK. The thermal conductivity can be calculated according to Wiedemann-Franz's law from the electric resistance of the reflective layer measured by the four-probe method. No upper limit is imposed on the thermal conductivity of the reflective layer. That is, use may be made of pure silver having the highest thermal conductivity of 250 W/mK among the materials which can be used to form the reflective layer.

The reflective layer preferably has a thickness of 10 to 300 nm. A layer with a thickness below the range may fail to provide a sufficient reflectivity whereas a layer with a thickness above the range achieves little further improvement in reflectivity and is economically disadvantageous. The reflective layer is preferably formed by a vapor deposition technique such as sputtering or evaporation.

First and Second Dielectric Layers 31 and 32

These dielectric layers prevent the recording layer from oxidation and degradation and protect the supporting substrate 20 and light-transparent substrate 2 by insulating the heat transferred from the recording layer during recording or releasing the heat in the lateral direction. The provision of these dielectric layers improves the degree of modulation.

The dielectric materials used in these dielectric layers are preferably compounds containing at least one metal component selected from Si, Ge, Zn, Al, and rare earth elements. The preferred compounds are oxides, nitrides and sulfides while mixtures containing at least two of these compounds are also useful.

To provide a rapid cooling structure, it is preferred that the dielectric layers, especially second dielectric layer 32 be formed of a dielectric material having a high thermal conductivity. Preferred dielectric materials having a high thermal conductivity are mixtures of zinc sulfide and silicon oxide (ZnS—SiO₂), aluminum nitride, aluminum oxide, silicon nitride and tantalum oxide, with oxides and/or nitrides of aluminum and oxides and/or nitrides of silicon being especially preferred. The ZnS—SiO₂ mixtures are preferably those containing 30 to 60 mol % of SiO₂. Such mixtures with too low SiO₂ contents have a low thermal conductivity whereas mixtures with too high SiO₂ contents are less adherent to another layer, with a possibility to undergo delamination during long-term storage.

The second dielectric layer 32 preferably has a thermal conductivity of at least 1 W/mK, more preferably at least 1.5 W/mK. No upper limit is imposed on the thermal conductivity of the second dielectric layer although materials which can be used to form the dielectric layers generally have a thermal conductivity of less than about 20 W/mK. It is noted that the thermal conductivity of the second dielectric layer as used herein is not a measurement in the thin film state, but a measurement of a bulk material.

The first and/or second dielectric layer may be a laminate of two or more sublayers of different dielectric compositions.

The thicknesses of the first and second dielectric layers may be determined as appropriate so as to provide satisfactory protective effects and modulation improving effects. Usually, the first dielectric layer 31 preferably has a thickness of 30 to 300 nm, more preferably 50 to 250 nm, and the second dielectric layer 32 preferably has a thickness of 10 to 50 nm. To provide a rapid cooling structure, the second dielectric layer 32 should more preferably have a thickness of up to 30 nm, most preferably up to 25 nm.

The dielectric layers are preferably formed by sputtering.

Recording Layer 4

The composition of the recording layer 4 is not critical and may be suitably selected from a variety of phase change materials, preferably phase change materials containing at least antimony (Sb) and tellurium (Te). Since a recording layer consisting solely of Sb and Te has a crystallization temperature as low as about 130° C. and is insufficient in storage reliability, another element(s) is preferably added for raising the crystallization temperature. The additive element is preferably at least one selected from among In, Ag, Au, Bi, Se, Al, P, Ge, H, Si, C, V, W, Ta, Zn, Ti, Sn, Pb, Pd, and rare earth elements (including Sc, Y and lanthanoids). Of these, at least one element selected from among rare earth elements, Ag, In and Ge is especially preferred because of outstanding storage reliability improving effects.

Preferred among the compositions containing Sb and Te are those represented by an atomic ratio composition:

$$(Sb_xTe_{1-x})_{1-y}M_y \qquad \text{Formula I}$$

wherein Sb is antimony, Te is tellurium, M is an element other than Sb and Te, x and y are in the range:

$0.2 \leq x \leq 0.90$ and $0 \leq y \leq 0.25$, more preferably $0.55 \leq x \leq 0.85$ and $0.01 \leq y \leq 0.20$.

In formula I, if x representative of the Sb content is too small, the results are a too low crystallization speed and a low signal output on reading due to a low reflectivity in crystalline regions of the recording layer. With very small values of x, recording becomes difficult as well. On the other hand, if x is too large, the difference in reflectivity between amorphous and crystalline states becomes small.

The element represented by M is not critical and is preferably at least one selected from the elements described above as exerting storage reliability improving effects. If y representative of the content of element M is too large, the crystallization speed becomes low. The range of y is as described above for this reason.

The recording layer preferably has a thickness of more than 4 nm to 50 nm, more preferably from 5 to 30 nm. With too thin a recording layer, the growth of a crystalline phase may be retarded, i.e., crystallization is obstructed. If the recording layer is too thick, the recording layer may have a large thermal capacity, resulting in difficult recording and a low signal output.

The recording layer is preferably formed by sputtering.

Light-transparent Substrate 2

The light-transparent substrate 2 has a sufficient transparency to transmit a recording/reading laser beam therethrough. A resin or glass plate having a thickness approximate to the supporting substrate 20 may be used as the light-transparent substrate 2. It is noted that the light-transparent substrate 2 is preferably made thin in order to achieve a high recording density by virtue of the increased NA of the recording/reading optical system. In this regard, the light-transparent substrate 2 should preferably have a thickness in the range of 30 to 300 μm. If the light-transparent substrate is too thin, dust depositing on the light-transparent substrate surface can have a substantial optical influence. If the light-transparent substrate is too thick, on the other hand, it may become difficult to achieve a high recording density by virtue of the increased NA.

A thin light-transparent substrate 2 can be formed, for example, by applying a light-transparent sheet of transparent resin to the first dielectric layer 31 with the aid of adhesive or tackifier, with the sheet serving as the light-transparent substrate. Alternatively, a transparent resin layer is formed directly on the first dielectric layer 31 by a coating technique, with the resin layer serving as the light-transparent substrate.

Structure of FIG. 4

The optical recording medium illustrated in FIG. 4 includes on a light-transparent substrate 2, a first dielectric layer 31, a recording layer 4, a second dielectric layer 32, a reflective layer 5, and a protective layer 6 stacked in the described order. A recording/reading laser beam is irradiated to the recording layer 4 through the light-transparent substrate 2 (from the lower side in FIG. 4).

The light-transparent substrate 2 in FIG. 4 may be the same as the supporting substrate 20 in FIG. 3 as long as it is light transmissive.

The protective layer 6 is provided for improving mar resistance and corrosion resistance. The protective layer may be formed of various organic materials, preferably radiation-curable compounds and compositions containing the same, which are cured with radiation such as electron beams or UV light. The protective layer is usually about 0.1 μm to about 100 μm thick. It may be formed by conventional techniques including spin coating, gravure coating, spray coating and dipping.

The remaining layers are the same as in the embodiment illustrated in FIG. 3.

EXAMPLE

Examples of the invention are given below by way of illustration and not by way of limitation.

Example 1

Optical recording disk samples of the structure illustrated in FIG. 3, capable of recording in the groove or land/groove recording mode, were prepared by the following procedure.

The supporting substrate 20 used was formed by molding polycarbonate into a disk having a diameter of 120 mm and a thickness of 1.2 mm. The supporting substrate was provided on its surface with a recess and protrusion pattern which would form grooves and lands in a light-transparent substrate 2 after transfer.

The reflective layer 5 was formed by sputtering in an Ar atmosphere. The target used was $Ag_{98}Pd_1Cu_1$. The reflective layer was 100 nm thick and had a thermal conductivity of 170 W/mK.

The second dielectric layer 32 was formed by sputtering an $Al_2O_3$ target in an Ar atmosphere. The second dielectric layer was 20 nm thick. The $Al_2O_3$ used as the target had a thermal conductivity of 10.5 W/mK.

The recording layer 4 was formed by sputtering an alloy target in an Ar atmosphere. The recording layer had the atomic ratio composition: $(Sb_{0.78}Te_{0.22})_{0.95}In_{0.01}Ge_{0.04}$. The recording layer was 12 nm thick.

The first dielectric layer 31 was formed by sputtering a target of ZnS (80 mol %) and $SiO_2$ (20 mol %) in an Ar atmosphere. The first dielectric layer was 130 nm thick.

The light-transparent substrate 2 was formed by applying a solvent type UV-curable acrylic resin onto the surface of the first dielectric layer 31 to form an adhesive layer of 3 μm thick and joining a polycarbonate sheet of 100 μm thick thereto.

The disk sample thus fabricated was initialized or crystallized by means of a bulk eraser. The disk sample was determined for cross-erasing by the following procedure and under the following conditions.

linear velocity: 5.7 m/s
laser wavelength λ: 405 nm
numerical aperture NA: 0.85
modulation code: (1,7)RLL First, 8T signals were recorded in a track to be tested, from which a carrier output C1 was produced. Then 7T signals were overwritten 10 times in two tracks positioned adjacent to the test track. Then a carrier output C2 from the 8T signal initially recorded in the test track was measured again. Cross-erasing is given by C2-C1. Table 1 reports G-XE for the cross-erasing in grooves and L-XE for the cross-erasing in lands.

Since cross-erasing should be measured on a medium having a very narrow track pitch in this Example, the medium of the groove recording mode inevitably has a very narrow groove width. It is then difficult to increase the dimensional precision of the sample. It is then difficult to obtain data with a high reliability. Then, in order to obtain reliable data, the cross-erasing in the groove recording mode was measured by the following procedure using a disk for evaluation shown in FIG. 5B.

Figure 5A:
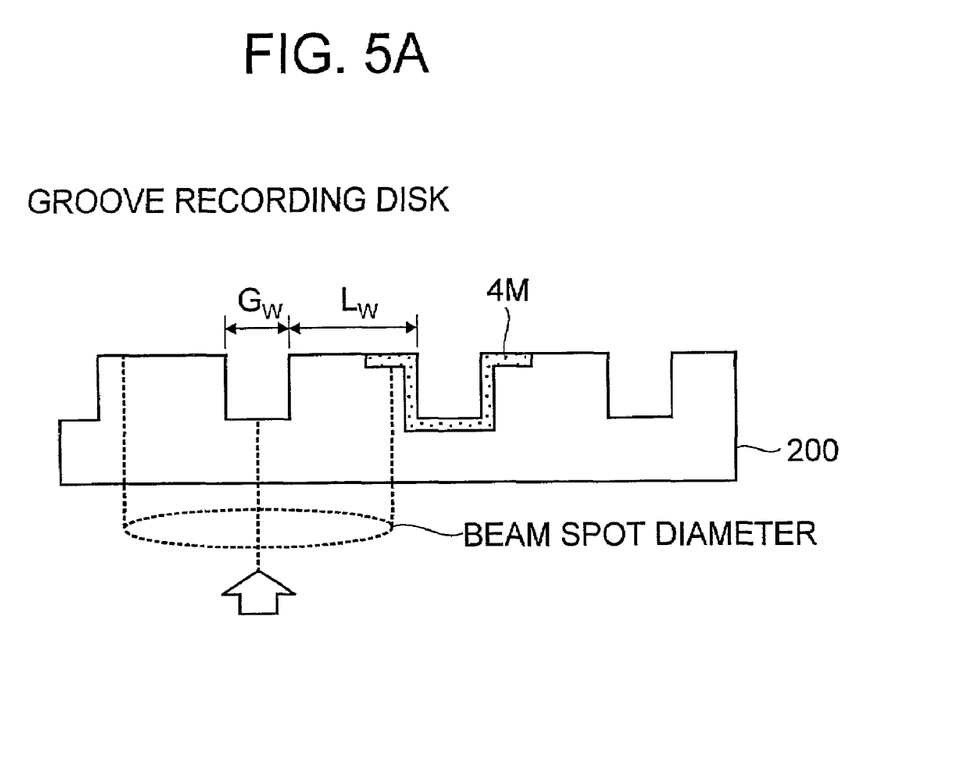
FIG. 5A is a schematic cross-sectional view of an optical recording medium of the groove recording mode.
Figure 5B:
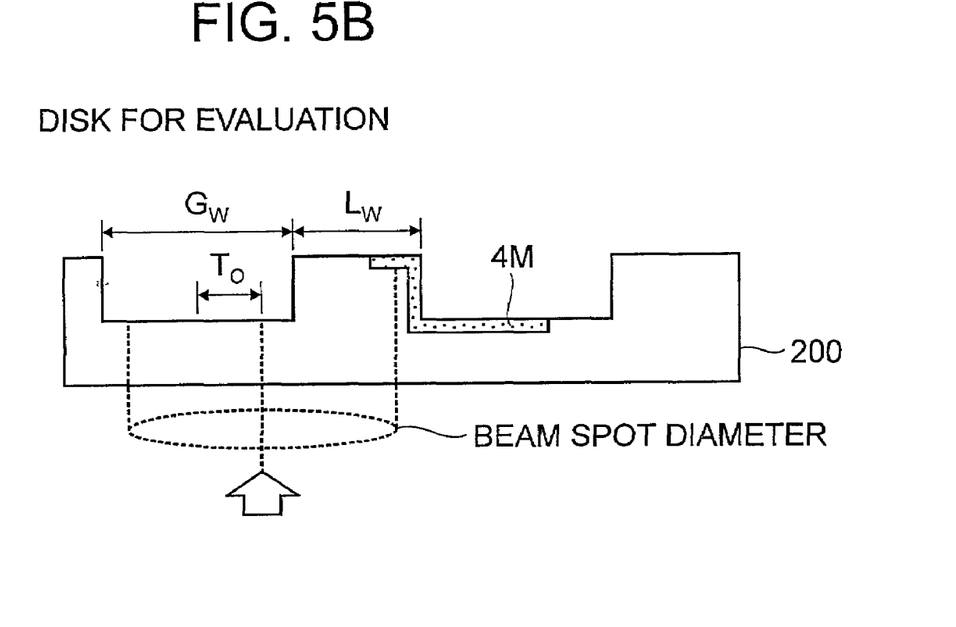
FIG. 5B is a schematic cross-sectional view of an optical recording disk of the groove recording mode used for evaluation in Example.

FIG. 5A is a cross-sectional view for schematically illustrating a run made on a conventional groove recording disk by previously forming a recorded mark 4M in a track to be tested, and then irradiating a laser beam to an adjacent track to induce cross-erasing. FIG. 5B illustrates a medium 200 used in this Example. The land width Lw in FIG. 5B is equal to the land width Lw in FIG. 5A, whereas the groove width Gw in FIG. 5B is greater than the groove width Gw in FIG. 5A. Because of this design, the disk of FIG. 5B is easy to manufacture and has a high dimensional precision. In this state, the track pitch in FIG. 5B is greater than the track pitch in FIG. 5A. With this taken into account, on measurement, as shown in FIG. 5B, a recorded mark 4M is first formed in a track to be tested using a laser beam which is offset in the transverse (width) direction of the track, from which C1 is measured. The offset distance is set such that the distance of the recorded mark 4M extending over the land may be equal between FIGS. 5A and 5B, that is, the distance from the center of the land to the center of the beam spot may be equal between FIGS. 5A and 5B.

Next, a laser beam is irradiated to an adjacent track to induce cross-erasing. In this irradiation stage, a laser beam which is offset in the transverse direction of the track is used as well. The offset distance To is equal to the offset distance used in the recorded mark formation.

Next, C2 is measured, from which C2–C1 is determined. It is understood that since this C2–C1 is the cross-erasing on one side of the recorded mark, similar measurement is made on the other side of the recorded mark. The sum of both the measurement results is the cross-erasing G-XE in the groove.

Table 1 reports the track pitch $P_T$ used in each recording mode. In samples of the land/groove recording mode, the groove width was equal to the land width. The track pitch $P_T$ in the groove recording mode is an imaginary track pitch calculated from the offset of the laser beam and corresponds to Gw+Lw in FIG. 5A. Also, in the groove recording mode, an imaginary groove width Gw calculated from the offset of the laser beam, that is, the value corresponding to Gw in FIG. 5A, was set so that the imaginary groove width divided by the imaginary track pitch, Gw/$P_T$, might fall in the range between 0.30 and 0.35.

After recording in each sample according to the groove recording mode, a photomicrograph of the recording layer was taken through a transmission electron microscope. From the photomicrograph, the recorded mark width Mw was determined, and its ratio to imaginary groove width Gw and its ratio to imaginary track pitch $P_T$ were calculated. As a result, Mw/Gw was in the range between 2.3 and 2.8, and Mw/$P_T$ was in the range between 0.70 and 0.85.

TABLE 1

| | | $\lambda$ = 405 nm, NA = 0.85 Cross-erasing (dB) | | |
|---|---|---|---|---|
| | | Groove recording | Land/groove recording | |
| $P_T$ | $P_T$/ | | | |
| ($\mu$m) | ($\lambda$/NA) | G-XE | G-XE | L-XE |
| 0.33 | 0.693 | 0 | −0.5 | 0 |
| 0.30 | 0.630 | 0 | −1.5 | 0 |
| 0.27 | 0.567 | 0 | −3.2 | 0 |
| 0.24 | 0.502 | −0.2 | −4.0 | −0.3 |

The effectiveness of the invention is evident from Table 1. Specifically, in the land/groove recording mode, cross-erasing in grooves occurred at a track pitch of 0.33 µm even when $P_T$/($\lambda$/NA) was 0.693 and approximately equal to that of DVD-RW. It is believed that this cross-erasing resulted from the tracking servomechanism which became unstable due to a high linear velocity and a narrow track pitch. In contrast, in the groove recording mode, cross-erasing did not occur at all even when the track pitch was reduced to 0.27 µm and was fully low even at a track pitch of 0.24 µm.

Example 2

Optical recording disk samples were fabricated as in Example 1 except that a supporting substrate 20 having a high dimensional precision in groove width was used and the track pitch $P_T$ was as shown in Table 2. It is noted that $P_T$ in Table 2 is not the imaginary track pitch in Example 1, but an actual track pitch.

These samples were evaluated as in Example 1. The results are shown in Table 2. After recording in each sample according to the groove recording mode, a photomicrograph of the recording layer was taken through a transmission electron microscope. From the photomicrograph, the recorded mark width Mw was determined, and its ratio to groove width Gw and its ratio to track pitch $P_T$ were calculated. As a result, Mw/Gw was in the range between 2.0 and 2.8, and Mw/$P_T$ was in the range between 0.70 and 0.86.

TABLE 2

| | | $\lambda$ = 405 nm, NA = 0.85 Cross-erasing (dB) | | |
|---|---|---|---|---|
| | | Groove recording | Land/groove recording | |
| $P_T$ | $P_T$/ | | | |
| ($\mu$m) | ($\lambda$/NA) | G-XE | G-XE | L-XE |
| 0.33 | 0.693 | 0 | −0.7 | 0 |
| 0.30 | 0.630 | 0 | −1.1 | 0 |
| 0.28 | 0.588 | 0 | −2.6 | 0 |
| 0.26 | 0.546 | −0.1 | −3.1 | −0.1 |
| 0.24 | 0.502 | −0.3 | −3.8 | −0.4 |

For each set of track pitch $P_T$ and $P_T$/($\lambda$/NA), data in Table 2 are equivalent to the data in Table 1. The effectiveness of the invention is evident from these results.

Example 3

Optical recording disk samples of the structure illustrated in FIG. 4, capable of recording in the groove or land/groove recording mode, were prepared by the following procedure.

The light-transparent substrate 2 was formed by injection molding polycarbonate into a disk having a diameter of 120 mm and a thickness of 0.6 mm in which grooves were simultaneously formed. In each of the groove recording mode and land/groove recording mode, the track pitch $P_T$ was as shown in Table 3. In the media of the groove recording mode, the groove width Gw was set so that Gw/$P_T$ might fall in the range between 0.30 and 0.35. In the media of the land/groove recording mode, the groove width was equal to the land width.

The first dielectric layer 31 was formed by sputtering a target of ZnS (80 mol %) and $SiO_2$ (20 mol %) in an Ar atmosphere. The first dielectric layer was 80 nm thick.

The recording layer 4 was formed by sputtering an alloy target in an Ar atmosphere. The recording layer had the atomic ratio composition: $(Sb_{0.72}Te_{0.28})_{0.88}Ag_{0.06}In_{0.04}Ge_{0.02}$. The recording layer was 23 nm thick.

The second dielectric layer 32 was formed by sputtering a target of ZnS (50 mol %) and $SiO_2$ (50 mol %) in an Ar atmosphere. The second dielectric layer was 25 nm thick. The ZnS—$SiO_2$ (50/50 mol %) used as the target had a thermal conductivity of 1.0 W/mK.

The reflective layer 5 was formed as in Example 1.

The protective layer 6 was formed by spin coating a UV-curable resin and irradiating UV thereto for curing. The protective layer was 5 µm thick.

The disk sample thus fabricated was initialized or crystallized by means of a bulk eraser. The disk sample was determined for cross-erasing by the same procedure as in Example 1 and under the following conditions.

linear velocity: 3.5 m/s
laser wavelength $\lambda$: 635 nm
numerical aperture NA: 0.60
modulation code: 8–16 modulation It is noted that the signal recorded in a track to be tested was 14T and the signal recorded in an adjacent track was 11T. The results are shown in Table 3.

After recording in each sample according to the groove recording mode, a photomicrograph of the recording layer was taken through a transmission electron microscope. From the photomicrograph, the recorded mark width Mw was determined, and its ratio to groove width Gw and its ratio to track pitch $P_T$ were calculated. As a result, Mw/Gw was in the range between 2.3 and 3.2, and Mw/$P_T$ was in the range between 0.70 and 0.96.

TABLE 3

| $P_T$ | $P_T/$ | Groove recording | Land/groove recording | |
|---|---|---|---|---|
| (μm) | (λ/NA) | G-XE | G-XE | L-XE |
| 0.74 | 0.699 | 0 | 0 | 0 |
| 0.70 | 0.661 | 0 | −0.5 | 0 |
| 0.67 | 0.633 | 0 | −1.0 | 0 |
| 0.60 | 0.567 | 0 | −2.1 | 0 |
| 0.56 | 0.529 | 0 | −3.2 | 0 |
| 0.50 | 0.472 | −0.7 | −4.5 | −0.8 |

λ = 635 nm, NA = 0.60
Cross-erasing (dB)

It is evident from Table 3 that in the land/groove recording mode, noticeable cross-erasing in grooves occur at $P_T/(\lambda/NA) \leq 0.68$. In contrast, in the groove recording mode, cross-erasing does not occur until $P_T/(\lambda/NA)$ is reduced to an extremely low level.

BENEFITS OF THE INVENTION

For high-density recording media which are recommended in the prior art to resort to the land/groove recording mode, the present invention employs the groove recording mode, succeeding in dramatically reducing the cross-erasing as compared with the land/groove recording mode. This enables to use a recording layer having a high crystallization speed which is otherwise difficult to reduce cross-erasing. Then a recording system with a high transfer rate is established. A possible reduction of the track pitch promises to establish a high-density recording system.

Japanese Patent Application No. 2000-309956 is incorporated herein by reference.

What is claimed is:

1. An optical recording method for recording information in an optical recording medium comprising a grooved light-transparent substrate including grooves and lands and a phase change recording layer thereon, by irradiating a laser beam thereto through an objective lens in an optical system, wherein
  the recording is carried out in a groove recording mode, in which only the grooves serve as a recording track, under the conditions:
  $0.48 \leq P_T/(\lambda/NA) \leq 0.74$ and $P_T \leq 0.50$ μm,
  provided that the laser beam used for recording has a wavelength λ, the objective lens has a numerical aperture NA, and recording tracks are arranged at a pitch $P_T$,
  wherein the grooves are located relatively closer to a plane through which the laser beam enters than the lands,
  wherein said optical recording medium includes the recording layer, a dielectric layer, and a reflective layer stacked on the light-transparent substrate in the described order, and
  wherein the reflective layer has a thermal conductivity of at least 100 W/mK, and the dielectric layer has a thermal conductivity of at least 1 W/mK.

2. An optical recording medium in which recording is carried out by the method of claim 1.

3. An optical recording method for recording information in an optical recording medium comprising a grooved light-transparent substrate and a phase change recording layer thereon, by irradiating a laser beam thereto through an objective lens in an optical system, wherein
  the recording is carried out in a groove recording mode, in which only grooves serve as a recording track, under the condition:
  $0.48 \leq P_T/(\lambda/NA) \leq 0.68$,
  provided that the laser beam used for recording has a wavelength λ, the objective lens has a numerical aperture NA, and recording track are arranged at a pitch $P_T$,
  wherein the recording forms a recorded mark having at least one end extending out of the groove, and
  wherein said optical recording medium includes the recording layer, a dielectric layer, and a reflective layer stacked on the light-transparent substrate in the described order,
  the reflective layer has a thermal conductivity of at least 100 W/mK, and the dielectric layer has a thermal conductivity of at least 1 W/mK.

4. An optical recording medium in which recording is carried out by the method of claim 3.

* * * * *